July 5, 1932.  E. L. BEECHER  1,865,668
SHOCK ABSORBER
Filed Nov. 8, 1930  5 Sheets-Sheet 1

INVENTOR
Eugene L. Beecher
BY Hull, Brock & West,
ATTORNEYS

July 5, 1932.  E. L. BEECHER  1,865,668
SHOCK ABSORBER
Filed Nov. 8, 1930   5 Sheets-Sheet 2

July 5, 1932.  E. L. BEECHER  1,865,668

SHOCK ABSORBER

Filed Nov. 8, 1930  5 Sheets-Sheet 3

INVENTOR
Eugene L. Beecher,
BY Hull, Brock & West,
ATTORNEYS.

July 5, 1932. E. L. BEECHER 1,865,668
SHOCK ABSORBER
Filed Nov. 8, 1930 5 Sheets-Sheet 4

INVENTOR
Eugene L. Beecher,
BY Hull, Brock & West.
ATTORNEYS.

Patented July 5, 1932

1,865,668

UNITED STATES PATENT OFFICE

EUGENE L. BEECHER, OF EAST CLEVELAND, OHIO, ASSIGNOR TO THE GABRIEL COMPANY, OF CLEVELAND, OHIO, A CORPORATION OF OHIO

SHOCK ABSORBER

Application filed November 8, 1930. Serial No. 494,336.

This invention relates to shock absorbers, and more particularly to hydraulic shock absorbers of the type wherein a vane carried by a shaft is mounted in a cylindrical working chamber and is movable by such shaft toward and from a partition provided with adjustable means for varying the resistance to the flow of liquid from one side of the working chamber, through said partition, to the opposite side. The shock absorber is of the general type shown, described and claimed in my application Serial No. 422,519, filed January 22, 1930.

It is the general purpose and object of the invention to provide a shock absorber of the character described which is extremely simple in construction and economical of production, but which will accomplish the purposes for which it is designed in an efficient manner.

A still further object of the invention is to provide, for shock absorbers of the type mentioned, effective means for controlling the area of the port through which the liquid is forced from one side of the working chamber through the partition to the opposite side, in such manner as to compensate for variations in viscosity of such liquid, due to temperature changes.

Further and more limited objects of the invention will appear hereinafter, and will be realized in and through the construction and arrangement of parts shown in the drawings, wherein.

Describing the various parts herein by reference characters and first in connection with Figs. 1–9 inclusive, 1 denotes one of the side members of an automobile to which my shock absorber is secured by means of a base plate 2 which in turn is fastened to the rear or inner end 3ª of a cylindrical casing 3. 4 denotes what may be termed a filler-block for the casing. This block, when fitted within the casing, provides with such casing a fixed partition within the working chamber in which the vane is oscillated, a cover for said working chamber, a reserve or replenishing chamber for the working chamber, a cover for the latter chamber, and an extended bearing for the shaft.

The block 4 is generally cylindrical in outline and fits snugly within the casing 3. At its rear or inner end it carries the integral segmental partition 5, the said partition projecting from a surface 6 parallel with the base 3ª and forming therewith and with the casing the working chamber 7. Between the parts 5 and 6 and the front or exterior thereof, the block 4 is provided with an annular recess 8 which, with the casing 3, provides an annular reserve chamber from which liquid may be supplied to the working chamber, as occasion may require, through the port 9 and check valve 10, the valve being retained within its chamber by means of a cage 11. The part 12 of the block which is intermediate the chambers 8 and 7 forms a cover for the latter chamber. From the chamber 8 the block extends outwardly or forwardly beyond the casing 3. The outer or front end of the block is provided with a cylindrical surface 13 which engages the corresponding inner surface of the casing and is also provided, beyond the surface 13, with an annular radially outwardly extending shoulder 14 from which there extends a cylindrical surface 15. The front or outer end of the casing 3 is provided with an annular shoulder 16, spaced rearwardly from the shoulder 14, and with a cylindrical surface 17 extending beyond the shoulder 16 and engaging the surface 15. In the groove formed between the shoulders 14 and 16 there is inserted a packing ring 18. The outer or front surface of the casing 3 is threaded, as indicated at 19, and the block 4 is anchored in place within the casing by means of a locking ring 20 which is threaded onto the outer or front end of the casing and which is provided with an inwardly extending flange 21, adapted to engage the front or outer end of the block 4 and force the same to its seat.

In order to facilitate the assembly of the block 4 in proper position within the casing and to prevent any relative rotary movement between the block and the casing, the latter is provided with a segmental guide plate 22 which may be secured to the casing 3 in any convenient manner and the side edges of which engage the opposite walls 23ª of a chamber 23 formed within the segmental partition. This chamber communicates with the rebound side of the working chamber 7 by means of a segmental port 24 formed between the outer wall of one of the branches 5ª of the partition and the adjacent wall of the casing, the said port in turn communicating at the narrowed end thereof which is remote from the rebound portion of the working chamber with a port 25 which in turn communicates with a chamber 26 in which a valve 27 is slidably mounted to control the effective cross-sectional area of the port 25. As will appear from Figs. 5, 6, and 7, one side of the chamber 26 is slotted, as shown at 28, whereby liquid delivered through the port 25 into the chamber 26 passes directly from the latter into the chamber 23. Liquid passing the valve 27 and discharged into the chamber 23 is delivered from said chamber through a port 29 in the branch 5ᵇ of the sectional partition to the impact side of the working chamber. Liquid from the impact side of the working chamber is delivered through the port 29 into the chamber 23 and thence to the rebound side of said chamber by means of a port 30, a ball check valve 31, and from the chamber 32 containing said check valve into the port 24, which at its point of communication with the chamber 32 is considerably wider, and hence of greater capacity, than the portion thereof which communicates with the port 25,—see Figs. 2 and 5.

The valve 27 is slidably mounted in the chamber 26 and comprises the rearwardly extended threaded stem 27ª, a cylindrical body portion 27ᵇ fitting the wall of the chamber 26, the said body portion being provided with an intermediate annular groove 27ᶜ adapted to register more or less fully with the port 25 and in all positions with the slot 28. It also comprises a forwardly projecting stem 27ᵈ which is guided in the block 4 and the end of which projects into the chamber 8, the end of the stem being provided with a projection 27ᵉ adapted to be engaged by a suitable tool which may be inserted through an opening 33 in the outer or front cover end of the block, which opening is closed by a removable plug 34. The stem 27ᵈ will fit the wall of the guide opening provided therefor in the block 4 with sufficient closeness to prevent any material amount of liquid from passing along said stem into the chamber 8, permitting air that may be delivered into the chamber 23, along with the liquid, to be delivered to the front end of the chamber 26 by a port 35, whence it passes around said stem and into the chamber 8.

Reference has been made hereinbefore to the manner of controlling the effective area of the port 25 in accordance with variations in the viscosity of the liquid in the working chamber as affected by variations in temperature. This is accomplished by means of a bi-metal thermostatic plate 36 which is mounted in and extends across the chamber 23, having one end staked within a seat 37 provided therefor in the branch 5ᵇ of the partition, while its other end is secured to the stem 27ª of the valve. The manner in which the latter is so secured is by forming such end into an open loop 36ª and providing the opposite branches of said loop with apertures adapted to be threaded on the stem 27ª. The loop is so formed that, when the legs are unattached to the stem 27ª, they will assume a position other than the parallel position shown in the drawings. Being held in such abnormal parallel position and then bored or drilled by a tool of the same diameter as the threaded stem 27ª, it follows that, when thte stem is threaded through the holes in the loop, the legs of the latter tend to assume their original position, with the result that the valve is locked against turning through the jarring imparted to the shock absorber when in use. However, if it is desired to adjust the valve so as to vary the effective area of the port 25, this adjustment may be accomplished by removing the plug 34 and applying a suitable tool to the end 27ᵉ of the valve stem and turning the valve in the appropriate direction, which will result in its being moved in such direction along the chamber 26. In order to prevent the valve from being unscrewed from the thermostat bar 36, the end of the stem 27ª is headed, after having been inserted through the apertured loop, as indicated at 27ᶠ.

The central portion of the block 4 is provided with a cylindrical bore 4ª constituting an elongated bearing for the shaft 38. This shaft is provided with a cylindrical enlargement 38ᵃ the opposite ends of which are adapted to engage the base 3ᵃ and the wall 6 of the block 4, respectively, with the cylindrical surface thereof engaging a corresponding cylindrical seat 5ᶜ provided therefor on the intermediate portion of the segmental partition 5. This shaft carries a composite vane which is constructed and mounted upon the shaft in the following manner:—

Figure 1:
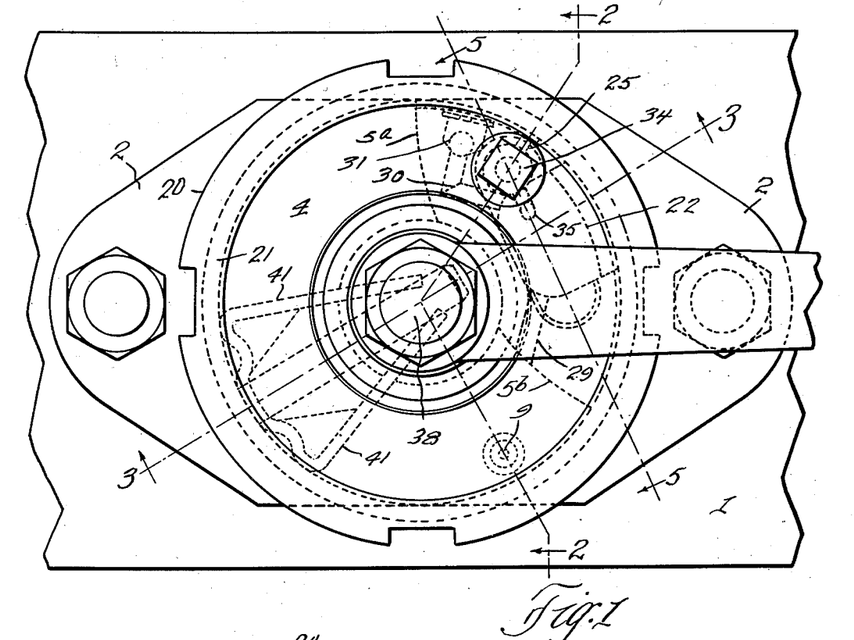
Fig. 1 represents a front elevation of a shock absorber constructed in accordance with my invention, showing the manner in which the same is mounted upon one of the side members of a vehicle.
Figure 2:
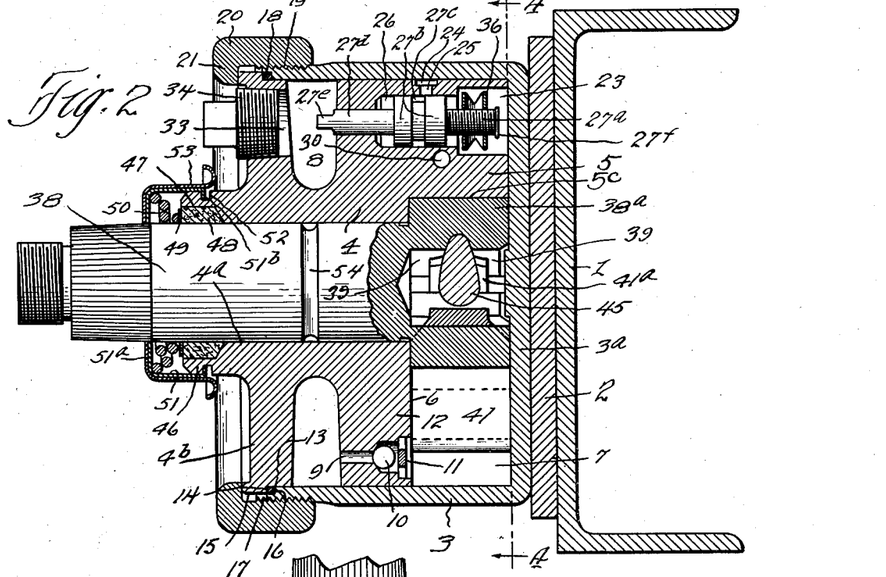
Figs. 2 and 3 are sectional views corresponding respectively to the lines 2—2 and 3—3 of Fig. 1.
Figure 3:
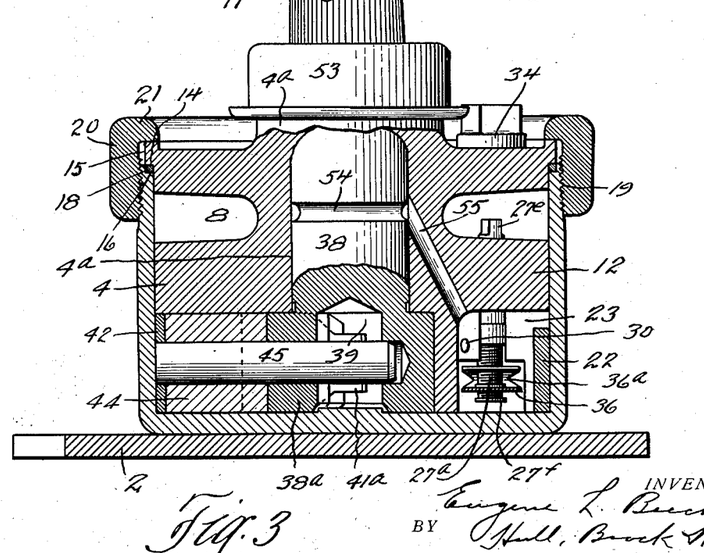
Figure 4:
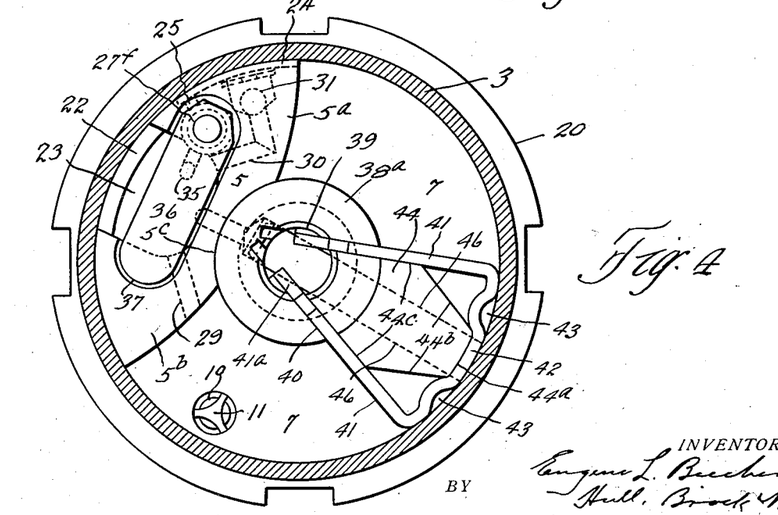
Fig. 4 is a sectional view corresponding to the line 4—4 of Fig. 2.
Figure 5:
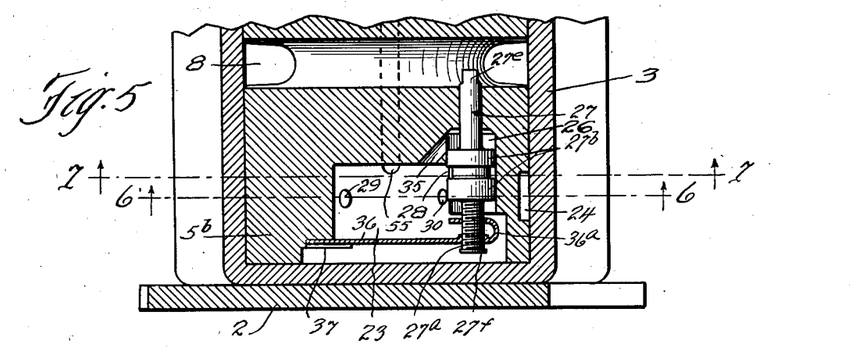
Fig. 5 is a sectional view corresponding to the line 5—5 of Fig. 1.

Extending forwardly or outwardly from the inner or rear end of the shaft is a centrally located chamber 39. This chamber, as will appear more particularly from Fig. 4, is generally cylindrical and from said chamber divergent slots 40 extend outwardly through the exterior of the shaft section 38ᵃ. The inclination of these slots is such that the inner ends of legs or plates inserted thereinto and projected into the chamber will fall within and be spaced from the inner wall thereof, as indicated on Figs. 1 and 4. These slots receive in practice the inner legs of the outer member of the vane. The outer member consists generally of an integral sheet metal stamping having sides 41 which converge inwardly toward the axis of the shaft and an outer segmental portion 42 integral with and connecting the outer ends of the sides, the outer portion being provided with pockets 43 between the central portion and the peripheral portions thereof,, the said central portion and peripheral portions fitting fairly snugly within the inner wall of the casing 3.

Figure 6:
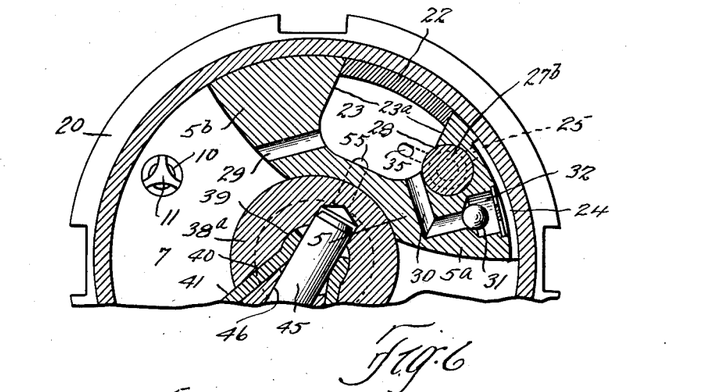
Figs. 6 and 7 are details in section corresponding respectively to the lines 6—6 and 7—7 of Fig. 5.
Figure 7:
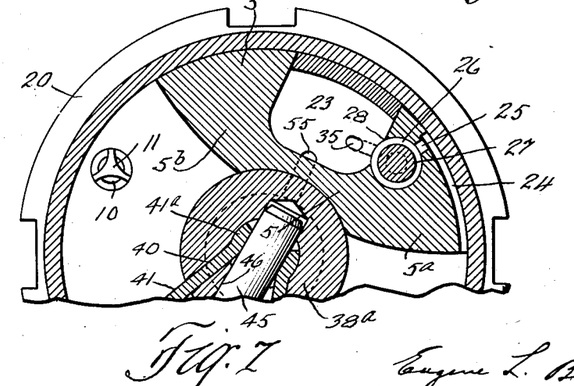

44 denotes an inner strengthening and reinforcing member within the outer member, said inner member comprising a metal block having a central outer portion provided with a cylindrical surface 44ᵃ engaging the inner intermediate cylindrical surface of the portion 42 of the outer member, the block being provided with inwardly diverging side walls 44ᵇ the outer ends of which engage the adjacent sides of the depressions in the inner member by which the pockets 43 are formed. These side walls extend out into engagement with the sides 41 of the inner member whence the inner member is provided with inwardly convergent side walls 44ᶜ engaging the sides 41 of the inner member. The inner and outer members are locked in place by means of a pin 45 which is driven through a bore 46 provided therefor, which bore extends inwardly from and through the central portion 42 of the inner member, through the outer member, and through the hub portion 38ᵃ of the shaft and preferably across the chamber 39. This pin is of such diameter as, when driven in place, to engage the inner ends 41ᵃ of the side members 41 and force them apart from the positions shown in Figs 1 and 4 to the positions where they engage the adjacent cylindrical portions of the wall of the chamber 39, as shown in Figs. 6 and 7, thereby locking both the inner and outer members in place.

The central portion of the block 4 projects beyond the wall 4ᵇ, providing a neck 46 which is provided with a recess 47, surrounding the shaft 38 and receiving a packing ring 48. This packing ring is pressed into its recess by means of an annular bearing plate 49, engaged by a spring 50, the spring being compressed against said plate by means of an annular flange 51ᵃ on a locking sleeve 51 having a flange 51ᵇ at its inner or rear end engaging an annular recess 52 provided therefor in the neck 46. The locking ring is in turn engaged by a cover 53—the construction of the parts 47–53 being substantially the same as shown, described and claimed in my application hereinbefore identified.

In order to check any leakage which passes around the shaft 38, the latter is provided with an annular groove 54 extending therearound, and a port 55 is provided in the block 4 which communicates at one end with said groove and at its opposite end with the chamber 23.

With the parts constructed and arranged as described, it is believed that the operation will be easily understood. As the vane is moved toward the branch 5ᵃ of the partition on rebound of the vehicle springs, its movement is resisted by the frictional resistance opposed to the passage of liquid from the rebound to the impact side of the working chamber through the ports 24 and 25, chamber 23 and port 29, the resistance to such movement being determined by the effective area of the delivery end of the port 25. The movement of the vane toward the opposite or impact side of the partition 5 will be resisted, but to a much less extent, by the comparatively free passage for the liquid from the impact side to the rebound side of the chamber provided by the ports 29 and 30 and the intermediate chamber 23. The automatic operation of the valve 27 by the thermostatic element will be readily understood, it being evident that the bi-metal plate will be so arranged that, when the temperature of the liquid in the chamber 23 is low, the area of the delivery end of the port 25 will be correspondingly enlarged and that, as the temperature rises in the liquid in the chamber 23, the valve 27 will be moved in the opposite direction thereby to restrict correspondingly the effective area of the delivery end of such port.

The pockets 43 are for the purpose of containing liquid and facilitating the provision of an effective seal between the outer portion of the vane and the adjacent inner wall of the casing.

Due to the manner of construction of the block 4, it forms (when inserted into the casing) a cover for the working chamber 7, a chambered partition between the opposite sides of the working chamber, a chamber for the reserve liquid for the working chamber, a cover for the casing, and an elongated bearing for the shaft 38. It will be evident that, because of this construction, a material economy in the production of shock absorbers embodying these features has been accomplished. It will also be evident that, due to the manner of constructing the vane, the latter may be produced at a comparatively low cost and may be quickly and conveniently assembled upon the shaft.

Reference has been made hereinbefore to the employment of the guide plate 22 and its function in securing the casing and block in nonrotative relation to each other. In addition to securing this result, the guide plate is so located that its opposite edges are preferably co-extensive in length with the width or thickness of the vane and are directly opposed to the movements of opposite sides of the outer end of said vane. This enables the said plate to receive and accommodate in the most efficient manner the thrusts imposed upon the opposite edges thereof by the walls of the chamber 23, through the movements of the vane toward opposite sides of the segmental partition.

The manner of mounting the valve 27 has the following advantages, additional to the convenience of adjusting the valve with reference to the port 25 without disconnecting it from the thermostat:

(a) The pressure to which the valve is subjected, due to the movements of the vane under impact, is nearly balanced by the pressure of the liquid in the chamber 23 acting upon opposite end portions thereof.

(b) The pressures to which the valve is subjected due to movements of the vane on rebound are completely balanced by virtue of the annular groove 28, the liquid entering said groove acting at once on opposite faces of equal area. When this liquid enters the chamber 23, its pressure is greatly reduced and is in effect dissipated in such chamber.

The advantages referred to above are of particular importance where the valve is operated by a thermostat, as they enable the thermostat to operate in a most efficient manner and without the hindrance which would be produced by subjecting the sliding valve connected therewith to unbalanced pressures.

Referring to the modification of my invention shown in Figs. 10 to 13 inclusive, 56 denotes a looped bi-metal thermostatic plate mounted within the chamber 23 and having the end $56^a$ secured to the top of the chamber by means of a special mounting, indicated generally at 57. This mounting is preferably made of light sheet steel and comprises a base $57^a$ provided with an aperture $57^b$ for the reception of a drive screw 58 by means of which the mounting is secured to the upper wall of the intermediate chamber 23. A flange $57^c$ extends at right angles from said base, and from the flange $57^c$ there extends a pair of forks $57^d$ having a slot $57^e$ therebetween. This slot forms a mounting for the shorter leg of the thermostatic loop, the end $56^a$ of such shorter leg being mounted in said slot with sufficient clearance between the surfaces of the said leg and the walls of the slot to accommodate such limited rocking and sliding movements of such leg as are caused by temperature changes while maintaining an effective connection between the end of the opposite leg and the valve. The opposite and longer leg of the loop is provided with a "drag hole" $56^b$ for the reception of the threaded end $27^a$ of the valve 27. In order to retain the valve in its adjusted position with reference to the port 25 and with reference to the thermostat, a spring 61 is mounted on the stem $27^a$ and bears at one end against the leg of the thermostat and at its opposite end against the annular surface of the valve from which such stem extends. As the "drag hole" $56^b$ is threaded on the valve stem, the spring prevents unintentional rotation of the valve stem with respect to the drag hole and thus retains the valve in the position to which it may have been adjusted.

Figures 8, 9, 14, 15:
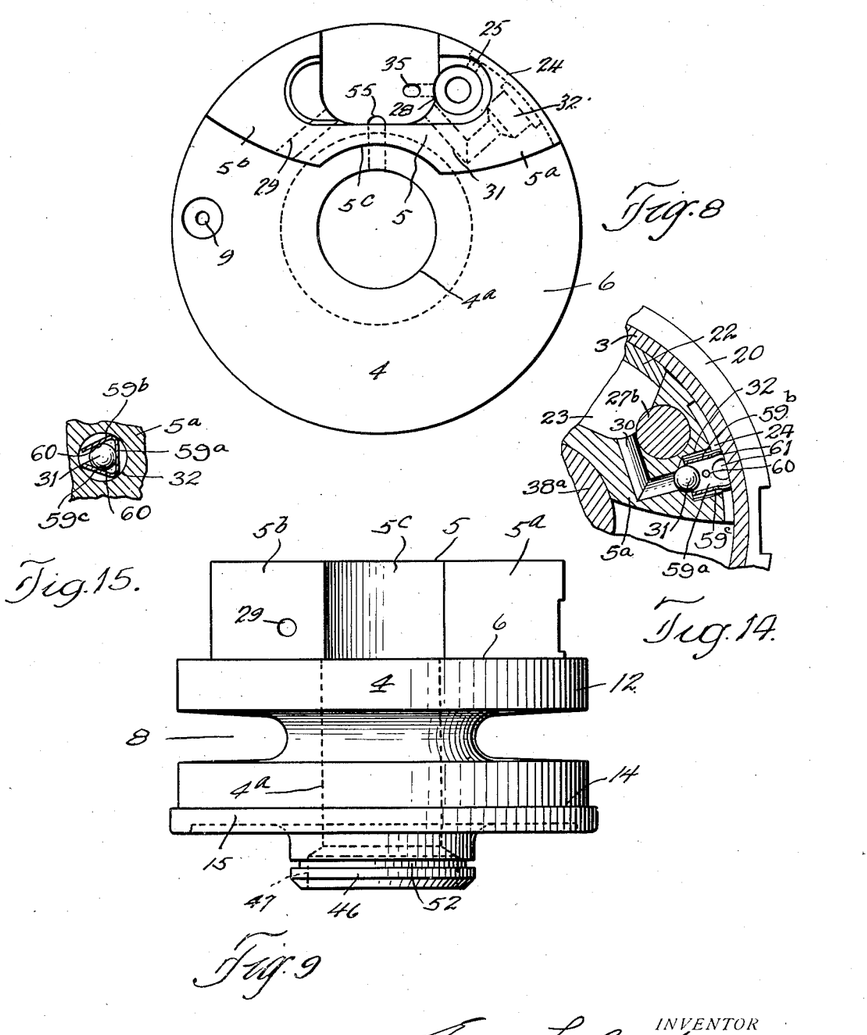
Fig. 8 is a rear elevation of the combined cover member and partition.
Fig. 9 is a side elevation of the same.
Figs. 14 and 15 are details in section showing the manner in which the check valve and the mounting therefor are employed.
Figure 10:
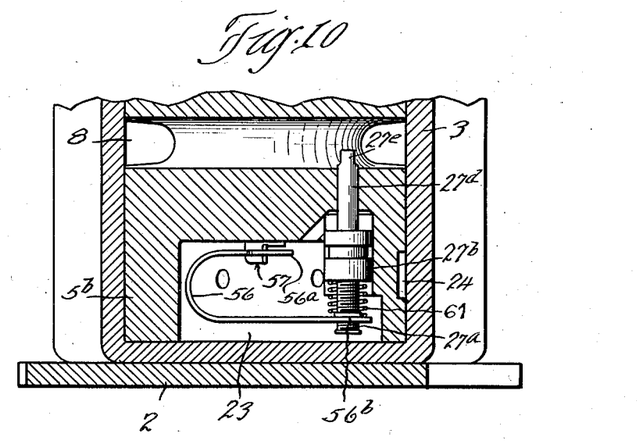
Figs. 10 and 11 are sectional details, similar respectively to Figs. 5 and 7, showing a modified form of thermostatic means for operating the rebound control valve.
Figures 11, 12, 13:
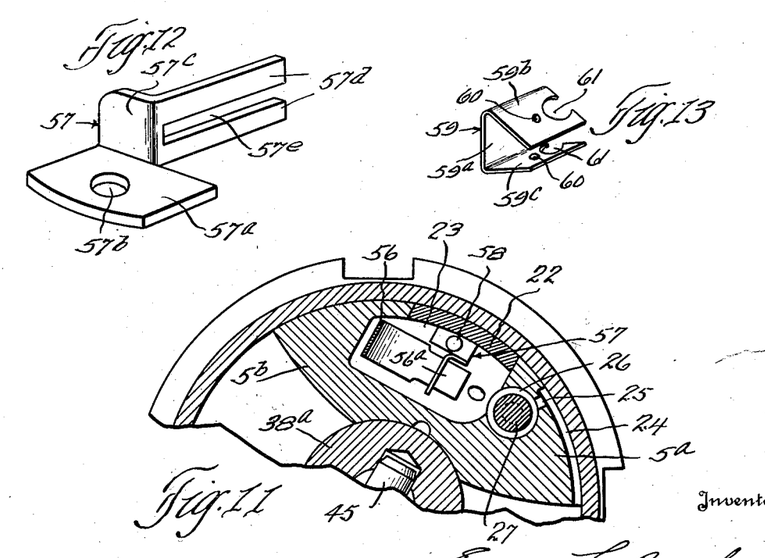
Fig. 12 a detail in perspective showing the device for fastening the thermostat in the intermediate chamber.
Fig. 13 a detail in perspective showing a modification of the check valve mounting on the rebound side of the segmental partition.

In Figs. 13, 14 and 15 there is shown a modification of the mounting for the ball check 31. In place of the ordinary cage, I employ a special cage 59 which is generally in the shape of a triangular prism comprising sides $59^a$, $59^b$ and $59^c$, there being a slot provided between the adjacent edges of the sides $59^b$ and $59^c$. The cage is made of resilient metal, such as sheet steel, and is of such dimensions as to enable it to be retained by the engagement of its corners with the walls of the chamber 32. The cage is inserted into the chamber by compressing the sides $59^b$ and $59^c$ toward each other and forcing the cage in place. When in place, the cage forms a guide for the valve 31, which is in contact with the inner wall of each of said sides in its travels. Each of the sides of the cage is provided with a projection 60 struck therefrom and projecting into the interior thereof, said projections constituting a stop to limit the movement of the ball outwardly from its seat. It will be noted that each side of the cage is recessed at its outer end, as indicated at 61. All of these notches will, when the cage is in place with its outer end in engagement with the casing 3, be in register with the widened portion of the port 24, whereby liquid passing through said port may operate effectively to seat the valve 31. By constructing the cage in the manner described, the inner walls thereof are engaged by the ball in its travels and it has been found that, due to this construction and arrangement, the fluttering movements, which have been created heretofore through the movement of ball checks in chambers and cages as ordinarily constructed, are overcome, together with the noises incidental to such movements.

Having thus described my invention, what I claim is:—

1. A shock absorber comprising, in combination, a cylindrical casing having a closed bottom, a unitary cylindrical block removably fitted in said casing and having one end thereof provided with a face substantially parallel with the bottom of the casing and a projection extending from one side of said face and adapted to engage the bottom of the casing and to provide therewith a partition between opposite ends of the working chamber formed between such face and projection and the bottom of the casing, the said block being provided between the said face and the opposite end thereof with a recess forming with the casing a reserve chamber, means engaging such opposite end of said block for securing the same within the casing, and a shaft having a piston within the working chamber, said shaft being mounted in an elongated bearing provided therefor in said block.

2. A shock-absorber comprising, in combination, a cylindrical casing having a closed bottom, a unitary cylindrical block removably fitted in said casing and having one end thereof provided with a face substantially parallel with the bottom of the casing and a projection extending from one side of said face and adapted to engage the bottom of the casing and to provide therewith a partition between opposite ends of the working chamber formed between such face and projection and the bottom of the casing, the said partition having a chamber extending thereinto from the bottom thereof and also having ports adapted to place the chamber therein in communication with the working chamber on opposite sides thereof, the said block being provided between the said face and the opposite end thereof with an annular recess forming with the casing an annular reserve chamber, means engaging such opposite end of said block for securing the same within the casing, and a shaft having a piston within the working chamber, said shaft being mounted in an elongated bearing provided therefor in said block.

3. A shock absorber comprising, in combination, a cylindrical casing having a closed bottom, a unitary cylindrical block removably fitted in said casing and having one end thereof provided with a face substantially parallel with the bottom of the casing and a projection extending from one side of said face and adapted to engage the bottom of the casing and to provide therewith a partition between opposite ends of the working chamber formed between such face and projection and the bottom of the casing, the said block being provided between the said face and the opposite end thereof with a recess forming with the casing a reserve chamber, the outer or front end of the casing being externally threaded and the corresponding end of the said block projecting longitudinally beyond such casing end, a clamping ring threaded onto the outer or front end of said casing and having an overhanging flange portion engaging the corresponding end portion of the block, and a shaft having a piston within the working chamber, said shaft being mounted in an elongated bearing provided therefor in said block.

4. A shock absorber comprising, in combination, a cylindrical casing having a closed bottom, a unitary cylindrical block removably fitted in said casing and having one end thereof provided with a face substantially parallel with the bottom of the casing and a projection extending from one side of said face and adapted to engage the bottom of the casing and to provide therewith a partition between opposite ends of the working chamber formed between such face and projection and the bottom of the casing, the said block being provided between the said face and the opposite end thereof with a recess forming with the casing a reserve chamber, the outer or front end of the casing being externally threaded and the corresponding end of the said block projecting longitudinally beyond such casing end, there being an annular packing groove provided between the outer end portion of the block and the outer end portion of the casing, a packing ring in said groove, a clamping ring threaded onto the said casing end and having an overhanging flange portion engaging the corresponding end portion of the block, and a shaft having a piston within the working chamber, said shaft being mounted in an elongated bearing provided therefor in said block.

5. A shock absorber comprising, in combination, a cylindrical casing having a closed bottom, a unitary cylindrical block removably fitted in said casing and having one end thereof provided with a face substantially parallel with the bottom of the casing and a projection extending from one side of said face and adapted to engage the bottom of the casing and to provide therewith a partition between opposite ends of the working chamber formed between such face and projection and the bottom of the casing, the said projection having a chamber extending thereinto from the bottom or rear end thereof and the said casing having a centering projection on the inner face thereof adapted to engage the opposite side walls of such chamber, the said block being provided between said face and the opposite end thereof with a recess forming with the casing, a reserve chamber, means engaging the opposite end of said block for securing the same within the casing, and a shaft having a piston within the working chamber, said shaft being mounted in an elongated bearing provided therefor in said block.

6. A shock absorber comprising, in combination, a casing having a working chamber therein, a piston in said working chamber movable toward and from the walls defining opposite ends of said chamber, there being a chamber provided between such walls and located intermediate the ends of the first mentioned chamber, there being a port communicating with one end of the working chamber and with such intermediate chamber and also a port communicating with the opposite end of the working chamber and with such intermediate chamber, a sliding valve controlling one of the aforesaid ports, and a looped thermostat located in the intermediate chamber and connected with said valve for moving the same thereby to vary the area of the discharge end of the last mentioned port in accordance with the temperature conditions of the liquid in the intermediate chamber.

7. A shock absorber comprising, in combination, a casing having a working chamber therein and a partition interposed between the opposite ends of such chamber, a piston in said working chamber movable toward and from opposite sides of said partition, the said partition having a chamber therein and a guide chamber communicating with the latter chamber, a valve slidably mounted in the guide chamber, there being a port communicating with one end of the working chamber and at its opposite end with the guide chamber, the said guide chamber in turn communicating with the first mentioned chamber in the partition, the partition also having a port communicating at one end with the chamber therein and at its opposite end with the opposite end of the working chamber, and a thermostat mounted in the partition chamber and adjustably connected with the said valve whereby the valve adjustably varies the area of the discharge end of the first mentioned port in accordance with the temperature of the liquid in said partition chamber.

8. A shock absorber comprising, in combination, a casing having a working chamber therein and a partition interposed between the opposite ends of such chamber, a piston in said working chamber movable toward and from opposite sides of said partition, the said partition having a cylindrical guide chamber therein, a cylindrical valve mounted to slide in said guide chamber, there being a chamber in said partition with which the guide chamber communicates and there being a port extending from the guide chamber through the partition to and communicating with one end of the working chamber and there being another port in said partition communicating at one end with the chamber therein and at its opposite end with the other end of the working chamber, the cylindrical valve being adapted by its movements to open and close more or less the delivery end of the first mentioned port, a thermostatic plate mounted in the partition chamber and connected to the said valve for moving the same in accordance with variations of the temperature of the liquid in such chamber.

9. A shock absorber comprising, in combination, a casing having a working chamber therein and a partition interposed between the opposite ends of such chamber, a piston in said working chamber movable toward and from opposite sides of said partition, the said partition having a guide chamber therein, a valve mounted to slide in said guide chamber, means including a port extending from the guide chamber through the partition to and communicating with one end of the working chamber for placing opposite portions of the working chamber in communication with each other, the valve being adapted by its movements to vary the cross sectional area of a portion of said port, and a thermostatic plate connected to the said valve for moving the same in accordance with variations of the temperature of the liquid in such chamber.

10. A shock absorber comprising, in combination, a casing having a working chamber therein and a partition interposed between the opposite ends of such chamber, a piston in said working chamber movable toward and from opposite sides of said partition, the said partition having a cylindrical guide chamber therein, a valve having a cylindrical body mounted in said guide chamber and provided with an annular recess in the body thereof providing a port and the said valve having a threaded stem projecting into a liquid containing chamber in said partition, the said partition having a port communicating at one end with one end of the working chamber and at its opposite end with the guide chamber and with the annular port formed in said valve, the said partition also having a port communicating at one end with the partition chamber and at its opposite end with the other end of the working chamber, a thermostat comprising a bi-metal plate having one end secured to the partition and having its body extending across the partition chamber and having a looped end provided with apertures receiving the threaded stem of the said valve.

11. A shock absorber comprising, in combination, a casing having a working chamber therein and a partition interposed between the opposite ends of such chamber, a piston in said working chamber movable toward and from opposite sides of said partition, the said partition having a guide chamber therein, a valve slidably mounted in said guide chamber, means including a port communicating at one end with one end of the working chamber and at its opposite end with the guide chamber for placing opposite portions of the working chamber in communication with each other, and a thermostat adjustably connected to said valve and subjected to the temperature of liquid in said casing.

12. A shock absorber comprising, in combination, a casing having a working chamber therein and a partition interposed between the opposite ends of such chamber, a piston in said working chamber movable toward and from opposite sides of said partition, the said partition having a chamber intermediate the ends thereof and a cylindrical guide chamber communicating freely at one side and at one end with such chamber, a valve slidably mounted in said guide chamber and having stems projecting from opposite ends of an intermediate cylindrical portion thereof which fits the guide chamber, there being a guide way for one of said stems extending from one end of the guide chamber and the opposite stem projecting into the partition chamber, the said partition having a port communicating at one end with the guide chamber and at its opposite end with one end of the working chamber, and also a second port communicating at one end with the partition chamber and at its opposite end with the other end of the working chamber, there being a port also communicating with the partition chamber and communicating with the end of the guide chamber from which the first mentioned stem extends, and a thermostatic element carried by said partition and exposed to the liquid therein and connected to the opposite stem of the said valve.

13. A shock absorber comprising, in combination, a casing having a working chamber and a reserve chamber therein and a partition interposed between the opposite ends of such working chamber, a piston in said working chamber movable toward and from opposite sides of said partition, the said partition having a guide chamber therein, a valve slidably mounted in said guide chamber and having stems projecting from opposite ends of an intermediate portion thereof which fits the guide chamber, there being a guide way for one of said stems extending from one end of the guide chamber to said reserve chamber, and means including a port communicating at one end with the guide chamber and at its opposite end with the other end of the working chamber for placing opposite portions of said working chamber in communication with each other.

14. A shock absorber comprising, in combination, a cylindrical casing, a partition in said casing, a shaft in said casing and a vane carried by said shaft and movable toward and from said partition, the said vane comprising an outer pressed metal member having an extended bearing surface cooperating with the inner surface of the casing and provided with radially inwardly inclined sides, a reinforcing block within the outer member and inserted between the peripheral portion thereof and the portion of the shaft interposed between the sides of such outer member, and common means securing the said members to said shaft.

15. A shock absorber comprising, in combination, a cylindrical casing, a partition in said casing, a shaft in said casing and a vane carried by said shaft and movable toward and from said partition, the said vane comprising an outer pressed metal member having an outer bearing surface cooperating with the inner surface of the casing and radially inwardly extending sides, a reinforcing block within the outer member and inserted between the peripheral portion thereof and the portion of the shaft interposed between the sides of such outer member, and common means securing the said members to said shaft.

16. A shock absorber comprising, in combination, a cylindrical casing, a partition in said casing, a shaft in said casing and a vane carried by said shaft and movable toward and from said partition, the said vane comprising an outer pressed metal member having an extended peripheral portion cooperating with the inner surface of the casing and sides converging radially toward the said shaft, a reinforcing block within the outer member and having a peripheral portion engaging the central portion of the outer member and inner side portions engaging the corresponding portions of the sides of the outer member, and common means for securing both members to the shaft.

17. A shock absorber comprising, in combination, a cylindrical casing, a partition in said casing, a shaft in said casing, and a vane carried by said shaft and movable toward and from the said partition, the said shaft having a chamber therein and the vane comprising a peripheral portion cooperating with the inner surface of the casing and converging sides extending through slots formed in said shaft and into the chamber therein, and a pin extending through the central peripheral portion of the vane and into the chamber of said shaft, the said pin being of such diameter as to force the inner ends of the sides of the vane toward the adjacent walls of the chamber.

18. A shock absorber comprising, in combination, a cylindrical casing, a partition in said casing, a shaft in said casing and a vane carried by said shaft and movable toward and from the said partition, the said shaft having a chamber therein, and the vane comprising an outer member having an extended peripheral portion cooperating with the inner surface of the casing and convergent side members extending through slots in the shaft into the chamber therein, an inner reinforcing member for the outer member, the said reinforcing member being inserted between the sides and the central peripheral portion of the outer member and the portion of the shaft between such sides of the outer member, and a pin extending through the central peripheral portion of the outer member, through the inner member, and into the chamber of the shaft and forcing the inner ends of the sides of the outer member apart and toward the portions of the wall of the said chamber adjacent thereto.

19. A shock absorber comprising, in combination, a casing having a working chamber therein, a piston in said working chamber movable toward and from the walls defining opposite ends of said chamber, there being a chamber provided between such walls and located intermediate the ends of the first mentioned chamber, a port communicating with one end of the working chamber and with such intermediate chamber and a port communicating with the opposite end of the working chamber and with such intermediate chamber, a sliding valve controlling one of the aforesaid ports, a looped thermostat located in the intermediate chamber and having one leg thereof adjustably connected with said valve, and means for slidably supporting the other leg of said thermostat.

20. A shock absorber comprising, in combination, a casing having a working chamber therein, a piston in said working chamber movable toward and from the walls defining opposite ends of said chamber, there being a chamber provided between such walls and located intermediate the ends of the first mentioned chamber, a port communicating with one end of the working chamber and with such intermediate chamber and a port communicating with the opposite end of the working chamber and with said intermediate chamber, a sliding valve controlling one of the aforesaid ports, a looped thermostat located in the intermediate chamber and having one leg thereof adjustably connected with said valve, means for slidably supporting the other leg of said loop, the said supporting means accommodating movements of the said thermostat at an angle to the line of movement of said valve.

21. A shock absorber comprising, in combination, a casing having a working chamber, a piston in said working chamber and movable toward and from the walls defining the impact and rebound ends, respectively, of said chamber, there being a by-pass passageway communicating through one of said walls with the impact end of said working chamber and communicating through a port and the other wall of said chamber with the rebound end of such chamber, a slide valve for controlling the effective area of such port, a thermostat connected to the said valve for operating the same, and means for balancing the pressure exerted against the said valve through the said port by movements of the piston toward the rebound end of the working chamber.

22. A shock absorber comprising, in combination, a casing having a working chamber, a piston in said working chamber and movable toward and from the walls defining the opposite ends of said chamber, there being a by-pass passageway communicating through one of said walls with one end of said working chamber and communicating through a port and the other wall of said chamber with the other end of such chamber, a slide valve for controlling the effective area of such port, a thermostat connected to the said valve for operating the same, and means for balancing the pressure exerted against the said valve through the said port by movements of the piston toward the adjacent end of the working chamber.

23. A shock absorber comprising, in combination, a casing having a working chamber, a piston in said working chamber and movable toward and from the walls defining the opposite ends of said chamber, there being a by-pass passageway communicating through one of said walls with one end of said working chamber and communicating through a port and the other wall of said chamber with the other end of such chamber and there being a guideway extending across the inner end of said port, a valve mounted to slide in said guideway and having an intermediate portion thereof in close sliding engagement with the guide chamber, the said intermediate portion being provided with a groove therearound adapted to register more or less with the inner end of said port, whereby the pressure exerted on said valve through said port is balanced, and a thermostat connected with said valve for moving the same in the guide chamber in accordance with variations in temperature of the liquid employed in the shock absorber.

24. A shock absorber comprising, in combination, a casing having a working chamber therein, a piston in said working chamber movable toward and from the walls defining opposite ends of said chamber, there being a chamber provided between such walls and located intermediate the ends of the first mentioned chamber and ports communicating respectively with opposite ends of the working chamber and with such intermediate chamber, a sliding valve controlling one of the aforesaid ports, a thermostat located in the intermediate chamber for moving the said valve thereby to vary the area of the discharge end of the last mentioned port in accordance with the temperature conditions of the liquid in the intermediate chamber, the said thermostat comprising a loop having one leg thereof anchored to a wall of said chamber and having its opposite end provided with an aperture whereby it is threaded onto an end of the said valve, and a spring bearing at one end against the portion of the thermostat so connected to said valve and at its other end against a portion of said valve.

25. A shock absorber comprising, in combination, a casing having a working chamber therein, a piston in said working chamber movable toward and from the walls defining opposite ends of said chamber, there being a chamber provided between such walls and located intermediate the ends of the first mentioned chamber and ports communicating respectively with opposite ends of the working chamber and with such intermediate chamber, a sliding valve controlling one of the aforesaid ports, a thermostat located in the intermediate chamber for moving the said valve thereby to vary the area of the discharge end of the last mentioned port in accordance with the temperature conditions of the liquid in the intermediate chamber, the said thermostat comprising a loop having one end thereof threaded on an end of the said valve, a spring pressing at one end against the portion of the thermostat which is threaded on the said valve and at its other end against a portion of said valve, and means connecting the other leg of said thermostat with a wall of said chamber, the said connecting means permitting a sliding and a limited rocking movement of such end of the loop.

26. A shock absorber comprising, in combination, a casing having a working chamber therein, a piston in said working chamber movable toward and from the walls defining opposite ends of said chamber, there being a chamber provided between such walls and located intermediate the ends of the first mentioned chamber and ports communicating respectively with opposite ends of the working chamber and with such intermediate chamber, a sliding valve controlling one of the aforesaid ports, a thermostat located in the intermediate chamber for moving the said valve thereby to vary the area of the discharge end of the last mentioned port in accordance with the temperature conditions of the liquid in the intermediate chamber, the said thermostat comprising a loop having one end thereof connected to the said valve, and means connecting the other leg of said thermostat with a wall of said chamber, the said connecting means permitting a sliding and a limited rocking movement of such end of the loop.

27. A shock absorber comprising, in combination, a casing having a working chamber therein, a piston in said working chamber movable toward and from opposite ends thereof, there being a by-pass passageway communicating at one end with one end of the working chamber and at its opposite end with a chamber which in turn communicates with the opposite end of the working chamber, a valve seat at the junction of the passageway and the second chamber, a ball check for said seat, and a prismatic cage for said valve in the last mentioned chamber, the inner walls of the said cage providing guides along which the ball travels toward and from its seat, and one or more of said walls being provided with a stop pressed inwardly therefrom to limit the travel of the ball away from its seat.

28. A shock absorber comprising, in combination, a casing having a working chamber therein, a piston in said working chamber movable toward and from opposite ends thereof, there being a by-pass passageway communicating at one end with one end of the working chamber and at its opposite end with a chamber which in turn communicates with the opposite end of the working chamber, a valve seat at the junction of the passageway and the second chamber, a ball check for said seat, and a prismatic cage for said valve in the last mentioned chamber, the inner walls of the said cage providing guides along which the ball travels toward and from its seat, and one or more of said walls being provided with a stop pressed inwardly therefrom to limit the travel of the ball away from its seat, two of the adjacent sides of said cage being normally spaced apart and the cage being made of resilient material whereby it may be contracted in cross sectional area to permit it to be inserted into said chamber and to be retained therein by frictional engagement of its edges with such chamber.

29. A shock absorber comprising, in combination, a casing having a working chamber therein, a piston in said working chamber movable toward and from opposite ends thereof, there being a by-pass passageway communicating at one end with one end of the working chamber and at its opposite end with a chamber which in turn communicates with the opposite end of the working chamber, a valve seat at the junction of the passageway and the second chamber, a ball check for said seat, and a prismatic cage for said valve in the last mentioned chamber, the inner walls of the said cage providing guides along which the ball travels toward and from its seat, two of the adjacent sides of said cage being normally spaced apart and the cage being made of resilient material whereby it may be contracted in cross sectional area to permit it to be inserted into said chamber and to be retained therein by frictional engagement of its edges with such chamber.

30. A shock absorber comprising, in combination, a cylindrical casing having a working chamber therein and a partition interposed between the opposite ends of said chamber, a piston in said chamber movable toward and from the opposite sides of said partition, there being a by-pass passageway in said partition communicating at one end with one end of the chamber and at its opposite end with a chamber having its outer end in communication with a port communicating at one end with the working chamber adjacent to the inner wall of the casing and extending across the second chamber, there being a valve-controlled port communicating with the end of the first-mentioned port which is remote from the working chamber, a valve seat at the junction of the passageway with the second chamber, a ball valve movable toward and from the said seat, and a resilient prismatic sheet metal cage for said ball pressed within the second chamber, one or more of the walls of the said cage being provided each with a projection adapted to constitute a stop to limit the movement of the ball away from its seat, the outer end of the cage being adapted to engage the outer wall of the first-mentioned port and the cage being provided at its outer end with one or more openings for access of liquid from such port to the interior of the cage.

31. A shock absorber comprising, in combination, a cylindrical casing having a working chamber therein and a partition interposed between the opposite ends of said chamber, a piston in said chamber movable toward and from the opposite sides of said partition, there being a by-pass passageway in said partition communicating at one end with one end of the chamber and at its opposite end with a chamber having its outer end in communication with a port communicating at one end with the working chamber adjacent to the inner wall of the casing and extending across the second chamber, there being a valve-controlled port communicating with the end of the first-mentioned port which is remote from the working chamber, a valve seat at the junction of the passageway with the second chamber, a ball valve movable toward and from the said seat, and a resilient prismatic sheet metal cage for said ball pressed within the second chamber, the outer end of the cage being adapted to project into the first-mentioned port and the cage being provided at its outer end with one or more openings for access of liquid from such port to the interior of the cage.

In testimony whereof, I hereunto affix my signature.

EUGENE L. BEECHER.